Figures 4, 5:
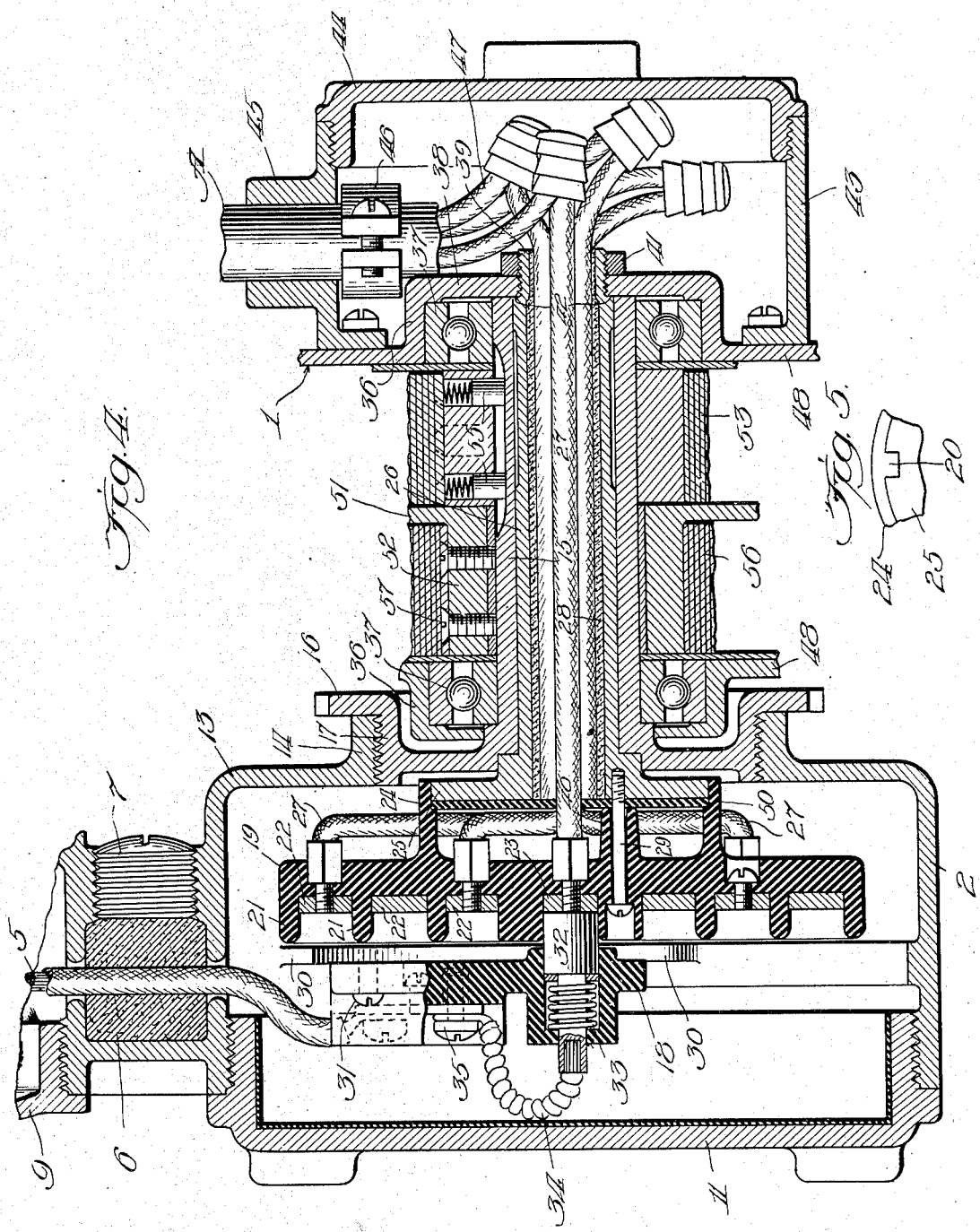

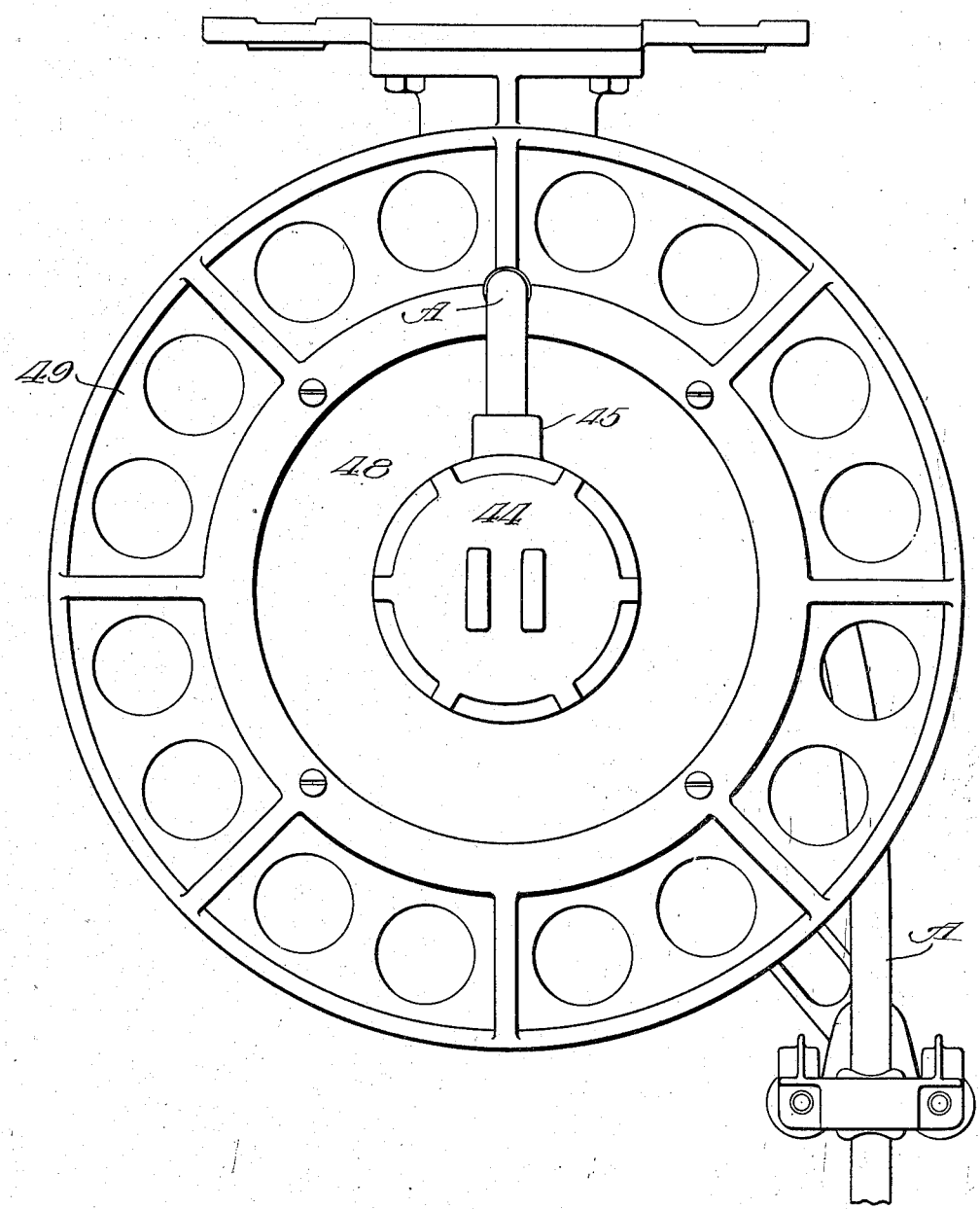

March 16, 1937.   N. A. TORNBLOM   2,074,305
EXPLOSIONPROOF CABLE REEL
Filed Sept. 19, 1936     4 Sheets-Sheet 3
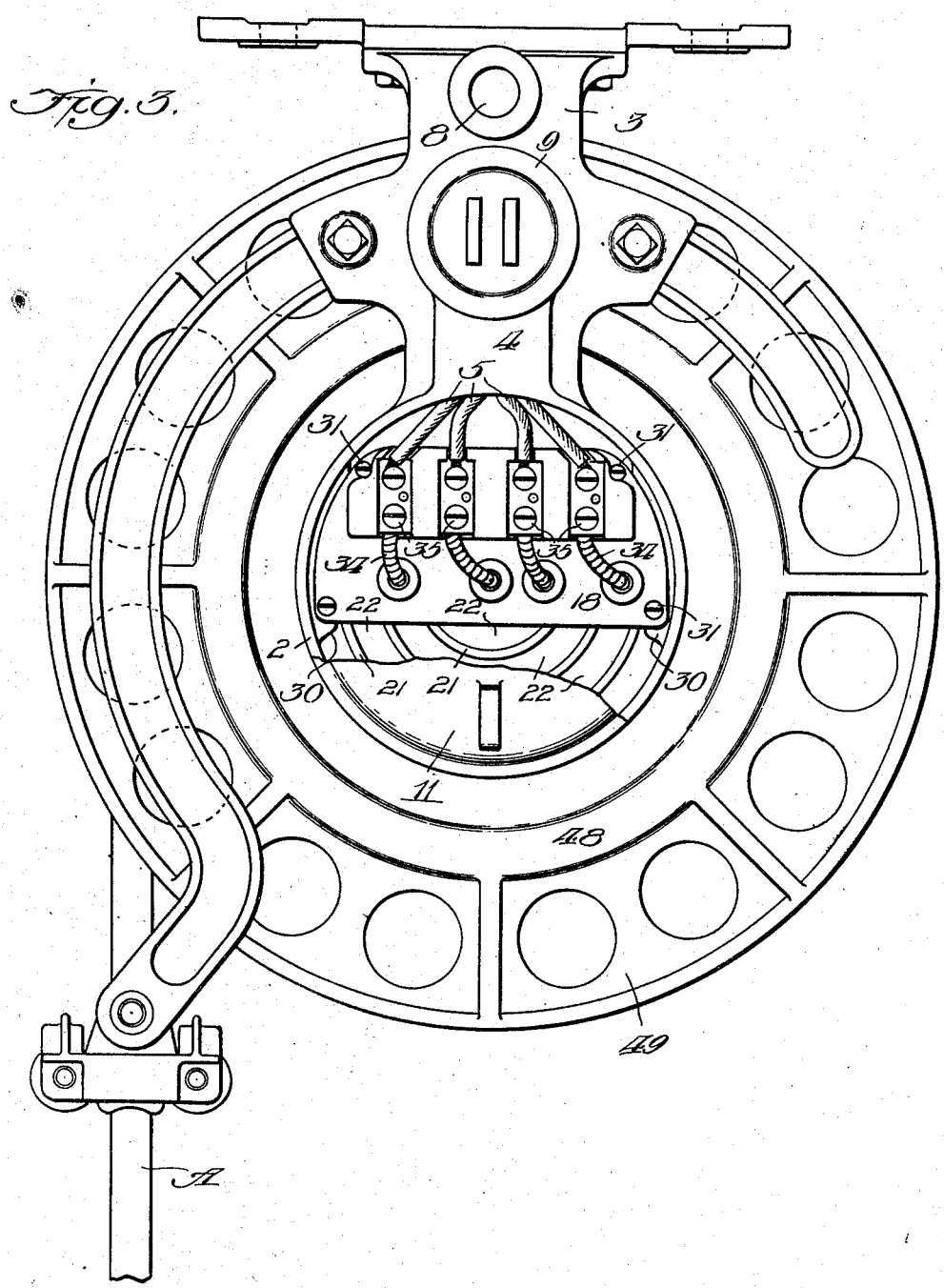

March 16, 1937.  N. A. TORNBLOM  2,074,305
EXPLOSIONPROOF CABLE REEL
Filed Sept. 19, 1936  4 Sheets-Sheet 4

Inventor:
Nils A. Tornblom.
by Wm. F. Freudenreich, Atty.

Patented Mar. 16, 1937

2,074,305

UNITED STATES PATENT OFFICE 2,074,305

EXPLOSIONPROOF CABLE REEL

Nils A. Tornblom, Chicago, Ill., assignor to Appleton Electric Company, a corporation of Illinois Application September 19, 1936, Serial No. 101,541

9 Claims. (Cl. 173—367)

Cables for carrying electric currents, wound upon reels, are widely used in many instances in situations where there is in the atmosphere inflammable or explosive gas. When an electric cable is normally wound upon a reel and is drawn off the reel to any required extent, it is necessary to provide current collector means of some kind between the conductors in the cable and the supply wires. Usually the collector means comprises brushes or contact fingers riding on collector rings movable relatively thereto, so that there is apt to be more or less arcing between the stationary and the movable contacts. Such arcing creates a dangerous situation when there is inflammable gas or gaseous mixture present.

The object of the present invention is to produce a cable reel construction in which the collector means are so effectively housed that no ignition of gases in the atmosphere surrounding the reel can result from arcs produced by the collector means or from the ignition of gases within the reel structure.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view, partly in side elevation and partly in section, of a reel embodying the present invention; Figs. 2 and 3 are front and rear views of the reel, on the same scale as Fig. 1, the larger part of one of the cover plates being broken away in Fig. 3; Fig. 4 is a vertical section along the axis of the reel, on a larger scale than Figure 1, showing only the central portion of the reel; and Fig. 5 is an elevation of a small fragment of the rotatable collector ring structure and its immediate support.

Referring to the drawings, I represents a suitable flanged drum or reel proper rotatably mounted upon a stationary casing in which are housed the collector or contact means to which arcing may occur. This casing comprises two sections although both are part of the single casting. The main section is a short cylindrical shell 2 the axis of which is horizontal and which is adapted to house the current collector means. The second section 3 lies above the member 2 and serves as a connection box for incoming wires. The sections 2 and 3 are joined by a hollow neck portion 4. The required number of conductors 5, of which I have shown four, pass from the chamber in the upper section 3 down into the chamber in the lower section 2 through the neck portion 4. The chamber in the neck is filled with a suitable sealing compound 6 after the conductors have been threaded through the same, thereby producing an effective seal between the two main chambers. The sealing compound may conveniently be introduced through an opening in the side of the part 4, which opening is then closed by a screw plug 7 sufficiently long to provide enough threads in the joint between the plug and the surrounding wall to make it impossible for flame or burning gases to go in or out past the plug.

The incoming wires may be led into the chamber in the upper section 3 through a suitable screw threaded opening 8 near the top of the chamber. Free access to this chamber may be had through a cover or closure 9 of large diameter that is screwed into an opening in the rear wall of the casing.

The cylindrical section 2 of the casing is open throughout the full diameter of the same on the rear side and, into this open end of the cylindrical section is screwed a cylinder head or cover 11; the screw threaded connection 12 containing a sufficient number of threads to insure against the passage of flame or burning fluid through the joint, in either direction. The opposite end of the cylindrical casing 2 has an integral head portion 13 provided with a large central opening surrounded by an outwardly projecting annular flange 14 which is internally screw threaded. The reel is supported upon a stationary tubular shaft-like cantilever arm 15 provided at the inner or rear end with a base portion in the form of a head 16 of large diameter provided with a rearwardly projecting, externally screw-threaded hub 17 that is screwed into the annular flange 14. There are in engagement with each other between the parts 14 and 17 a sufficient number of screw threads to insure against the passage through the joint between these members, in either direction, of flame or burning fluids.

Within the cylindrical casing member 2 are a stationary brush holder 18 and a rotatable mounting 19 for collector rings cooperating with brushes in the brush holder. The details of this part of the apparatus and of the electrical connections with the cable proper are best shown in Fig. 4. Referring to this figure, it will be seen that the collector ring mounting comprises a thick vertical disk of insulating material having on the rear face municating at its inner end with the interior of the casing, a tubular shaft extending through said bore and having a long bearing therein, a cable reel rotatable on said arm, a cable on said reel, conductors extending from said cable through the interior of said shaft and into the casing, a sealing compound filling the bore in the shaft around said conductors, and a driving connection between the outer end of the shaft and said reel.

2. In combination, a closed casing having an arm projecting therefrom, said arm having a cylindrical bore extending throughout the length of the same and opening into the chamber in the casing, a tubular shaft rotatably mounted in the bore of said arm and having a long bearing therein, contact pieces mounted on the inner end of said shaft within the casing for rotation with the shaft, conductors extending from said contact pieces through the interior of the shaft to the outer end of the latter, a sealing compound filling the interior of the shaft around the conductors therein, a reel rotatable on said arm, a driving connection between the reel and the outer end of the shaft, a cable on the reel, and a connection between the cable and the outer ends of said conductors.

3. In combination, a closed casing having a large opening in a wall thereof, a tubular arm outside of the casing having at its inner end a head screwed into and serving as a closure for said opening, a tubular shaft extending through and having a long bearing in said arm, the inner end of said shaft extending into said casing, current collector means in the casing including a member fixed to the shaft, conductors leading from said member through the bore in the shaft, a sealing compound filling the interstices in the bore around the conductors, a reel rotatable on said arm, and a driving connection between the reel and the outer end of said shaft.

4. In combination, a closed casing having a projecting arm containing a cylindrical bore extending lengthwise through the same and communicating at its inner end with the interior of the casing, a tubular shaft extending through said bore and having a long bearing therein, a cable reel rotatable on said arm, a cable on said reel, conductors extending from said cable through the interior of said shaft and into the casing, a sealing compound filling the bore in the shaft around said conductors, a driving connection between the outer end of the shaft and said reel, said casing having an inlet chamber communicating with the interior thereof, conductors entering the casing through said chamber, a sealing compound filling said chamber around the conductors therein, and means housed in the casing, including a part driven by said shaft, to maintain electrical connections between the two sets of conductors.

5. In combination, a closed casing having a projecting arm containing a cylindrical bore extending lengthwise through the same and communicating at its inner end with the interior of the casing, a tubular shaft extending through said bore and having a long bearing therein, a cable reel rotatable on said arm, a cable on said reel, conductors extending from said cable through the interior of said shaft and into the casing, a sealing compound filling the bore in the shaft around said conductors, a driving connection between the outer end of the shaft and said reel, a connection box, a hollow neck member connecting said box and said casing, conductors extending from said box through said neck member and into the casing, a sealing compound filling the interior of said neck member around the conductors therein, and means, including a part driven by said shaft, to maintain electrical connections between the two sets of conductors.

6. In combination, a closed casing having an arm projecting therefrom, said arm having a cylindrical bore extending throughout the length of the same and opening into the chamber in the casing, a tubular shaft rotatably mounted in the bore of said arm and having a long bearing therein, collector rings mounted on the inner end of said shaft within the casing for rotation with the shaft, stationary contact pieces in the casing engaged with the rings, conductors extending from said connector rings through the interior of the shaft to the outer end of the latter, a sealing compound filling the interior of the shaft around the conductors therein, a reel rotatable on said arm, a driving connection between the reel and the outer end of the shaft, a cable on the reel, and a connection between the cable and the outer ends of said conductors.

7. In combination, a closed casing having a large opening in a wall thereof, a tubular arm outside of the casing having at its inner end a head screwed into and serving as a closure for said opening, a tubular shaft extending through and having a long bearing in said arm, a flange of considerable diameter on the inner end of said shaft within said casing, current collector means in the casing including stationary contacts and movable contacts mounted on said flanges, conductors leading from said movable contacts through the bore in the shaft, a sealing compound filling the interstices in the bore around the conductors, a reel rotatable on said arm, and a driving connection between the reel and the outer end of said shaft.

8. A structure constituting a casing for a current collector and a support for a cable reel, which comprises a cylindrical shell internally screw-threaded at one end and having an end wall at the other end, a cover screwed into the said open end, said wall having an opening at the center thereof, a head screwed into said opening, and a long tubular arm projecting outwardly from the center of said head, the bore in the arm extending through said head and communicating with the space within the shell.

9. A structure constituting a casing for a current collector and a support for a cable reel, which comprises a cylindrical shell, a connection box and a tubular neck connecting the same, in the form of a single casting; the shell being open at one end and having an end wall at the other end; a cover screwed into the open end of the shell; said end wall having a central opening; and a tubular member in the form of a shaft-like arm having an enlarged head at one end, the said head being screwed into the opening in said end wall of the shell.

NILS A. TORNBLOM.

Patented Mar. 16, 1937

2,074,306

UNITED STATES PATENT OFFICE 2,074,306

PROCESS FOR THE PREPARATION OF ANTHRAQUINONE COMPOUNDS

Myron S. Whelen, Milwaukee, Wis., assignor to E. I. du Pont de Nemours & Company, Wilmington, Del., a corporation of Delaware No Drawing. Application June 24, 1936, Serial No. 87,117

4 Claims. (Cl. 260—57)

This invention relates to the preparation of anthraquinone compounds, more particularly to a new and improved process for the isolation of 6-halogen-1-anthraquinonesulfonic acids in substantially pure form directly from their sulfonation mass.

Due to the formation of isomeric alpha-monosulfonic acids in the sulfonation of beta-halogen-anthraquinones, it has been impossible to obtain pure 6-halogen-1-anthraquinonesulfonic acid by that route. Where the diluted sulfonation mass is salted with a potassium salt, not only the 6-chloro-1-anthraquinonesulfonic acid is precipitated but other impurities which cannot be separated therefrom by known methods.

It is, therefore, an object of this invention to provide a process for the preparation of relatively pure 6-halogen-1-anthraquinonesulfonic acid directly from beta-halogen-anthraquinone. It is a further object to provide a new and effective method for separating 6-halogen-1-anthraquinone directly from the sulfonation mass, substantially free from isomers and other contaminating impurities, by a simple, economical and commercially practical procedure.

I have now found that relatively pure 6-halogen-1-anthraquinonesulfonic acids may be obtained in the form of the sodium salt by direct sulfonation of beta-halogen-anthraquinone and by direct precipitation of the sodium salt from the diluted sulfonation mass. According to the present invention the sulfonation mass is diluted in water to an acid concentration of from 5 to 10% and an amount of sodium carbonate is added somewhat in excess of that necessary to form the sodium salt of the 6-halogen-anthraquinone-sulfonic acids theoretically present in the solution.

The following examples are given to more fully illustrate the invention. The parts used are by weight.

Example 1

575 parts of 25% oleum, 100 parts of 65% oleum and 3 parts of mercuric sulfate are mixed together and heated to 60° C. To this solution are added, while stirring, 300 parts of beta-chloroanthra-quinone. The temperature is then slowly raised to 125° C. and maintained at 125-130° C. until sulfonation of the beta-chloroanthraquinone is complete. The mass is then drowned in about 9000 parts of warm water containing 5 parts of sodium chlorate. It is then heated to 90–100° C. for one-half hour and filtered, if any solid material is present. To the filtrate 150 parts of soda ash are added and the suspension is allowed to stand for several hours after room temperature has been reached. The precipitated material is filtered off and sucked as dry as possible. If desired, very pure material may be obtained by reslurrying this product in about 3000 parts of warm water, followed by filtration at about 40° C. The material so obtained is practically pure 6-chloro-anthraquinone-1-sulfonic acid sodium salt.

The use of a potassium salt in place of the sodium salt in the above example, apparently because of the insolubility of the potassium salt of the 6-chloro-1-anthraquinonesulfonic acid in dilute acid as well as the insolubility of the potassium salt of the isomeric and disulfonic acid bodies present in the sulfonation mass, gives a very impure 6-chloro-1-anthraquinonesulfonic acid popure potassium salt. The purity of the products is determined by converting them to the 1,6-dichloro-anthraquinone which has a definite melting point. The melting point of the 1,6-dichloroanthraquin-one obtained from the procedure above outlined, prior to reslurrying in water, is 190–195° C., while the melting point of the dichloro compound obtained by the use of potassium salt varies from 162–173° C. Reslurrying of the sodium salt in water as described above gives a product which has a melting point of 195–200° C., while reslurrying of the potassium salt gives a product having a melting point of 173–178° C. The melting point found in the literature for pure 1,6-dichloroanthraquinone is 202° C.

Example 2

200 parts of 25% oleum, 35 parts of 65% oleum and 2 parts of mercuric sulfate are mixed together and heated under agitation to 60° C. 100 parts of beta-bromoanthraquinone are added and the mass is heated at 130° C. until sulfonation is complete. It is then drowned in water and treated in a manner analogous to that described in Example 1. The product obtained is substantially pure 6-bromo-1-anthraquinonesulfonic acid sodium salt.

To effect the desired separation of the 6-halogen-1-anthraquinone sulfonic acid the sulfonation mass is preferably diluted to an acid concentration of approximately 5%, figured on the amount of free sulfuric acid remaining in the solution, although it will be obvious that the exact concentration is not critical and may be raised or lowered to some extent. Too great a dilution decreases the yield of the desired product to some degree due to the slight solubility of the sodium salt, while higher acid concentrations are less desirable due to mechanical difficulties ex-